United States Patent [19]
Mehta et al.

[11] Patent Number: 5,297,724
[45] Date of Patent: Mar. 29, 1994

[54] WAVE SOLDERING METHOD AND APPARATUS

[75] Inventors: Apurya Mehta, Piscataway, N.J.; Sean M. Adams, Bethlehem, Pa.

[73] Assignee: The BOC Group, Inc., Murray Hill, N.J.

[21] Appl. No.: 67,764

[22] Filed: May 26, 1993

[51] Int. Cl.[5] .................. B23K 20/14; B23K 1/08
[52] U.S. Cl. .................... 228/219; 228/260; 228/37
[58] Field of Search ............... 228/260, 219, 37, 42

[56] References Cited

U.S. PATENT DOCUMENTS

| | | | |
|---|---|---|---|
| 3,218,193 | 11/1965 | Isaacson | 228/37 |
| 4,871,105 | 10/1989 | Fisher et al. | 228/37 |
| 5,090,651 | 2/1992 | Mittag | 228/219 |
| 5,203,489 | 4/1993 | Gileta et al. | 228/219 |
| 5,230,460 | 7/1993 | Deamborsio et al. | 228/42 |

FOREIGN PATENT DOCUMENTS 0440264  8/1991  European Pat. Off. ............ 228/219

Primary Examiner—Kurt C. Rowan
Assistant Examiner—Jeffrey T. Knapp
Attorney, Agent, or Firm—Larry R. Cassett

[57] ABSTRACT

Wave soldering method and apparatus for fluxing a substrate in a low oxygen containing atmosphere, preheating the fluxed substrate at least partially in a non-low oxygen containing atmosphere, and soldering the preheated substrate in a low oxygen containing atmosphere.

19 Claims, 2 Drawing Sheets

WAVE SOLDERING METHOD AND APPARATUS

BACKGROUND OF THE INVENTION

The present invention is directed to a method and apparatus for wave soldering a substrate, such as a printed circuit board, wherein the fluxing step is conducted in a low oxygen containing atmosphere while at least a portion of the preheating step is conducted in a non-low oxygen containing atmosphere, such as air.

BACKGROUND OF THE PRIOR ART

Wave soldering is an automated process for soldering electronic components to a substrate such as a printed circuit board. The electronic components are fitted into pre-drilled holes in a manner to ensure the electronic components are electrically connected to the circuit board using molten solder.

It is often desirable to pretreat the circuit board with a flux to improve the wetability and solderability of the circuit board. The flux reacts with metal oxide on the electronic components and on the circuit board and dissolves them so that a clean solder joint can be formed.

After fluxing, the circuit board is preheated to a temperature sufficient to dry the board, activate the flux and prepare the board for the soldering operation. The preheated circuit board is then passed to the wave soldering operation where the solder wave applies solder to the electronic components. As the board is removed from the solder wave, the solder cools and solder joints and coatings remain on the board.

In typical wave soldering operations the board is cleaned to remove the remaining flux and flux residues. Elimination of these undesirable materials from the circuit board is necessary to reduce corrosive residues which can impair the reliability of the circuit board.

However, the cleaning operation to remove flux and flux residues is costly and time consuming. There has thus been developed no-clean fluxes which leave minimal residues and have no deleterious affect on the circuit board. A no-clean flux is comprised of a non-corrosive or non-conductive organic acid dissolved in a solvent such as a lower alkanol (e.g. isopropanol).

Wave soldering machines have conducted the fluxing, preheating, soldering and detaching operations entirely in air or entirely in an inert or protective atmosphere. Conducting the process entirely in air is the least expensive mode of operation, but is disadvantageous because of the development of dross (metal oxides) and other defects in the circuit board. If an inert atmosphere is used for the soldering operations, the amount of dross as well as the number of defects is reduced, but at a considerable increase in cost owing to the cost of inerting (e.g. adding nitrogen gas).

Hagerty et al., U.S. Pat. Nos. 5,121,875 and 5,176,307, describe a process and apparatus for soldering a printed circuit board in which fluxing and preheating are conducted in air, while the soldering operation is conducted in a protective atmosphere and detachment of the circuit board is conducted in a controlled atmosphere. This arrangement is stated to provide an economical design for new wave soldering machines initially needed to operate under a protective atmosphere and for retrofitting existing wave soldering machines originally designed to solder in air.

However, the process described in U.S. Pat. No. 5,121,875 suffers from disadvantages. A large amount of flux is needed because of excessive volatilization of the fluxing solvents in air. In addition, when fluxing is conducted in air, ignition of the flux may be more prevalent which can result in flux fires when an ignition source is present. Still further, the amount of inert gas needed in the soldering stage of the wave soldering operation is excessive because high inert gas flows are necessary to keep air out of the enclosure encompassing the solder pot and to keep the amount of oxygen down to desirable levels.

It would therefore be of benefit to provide a wave soldering process in which volatilization of solvents is minimized, flux ignition is prevented and/or the amount of inert gas needed for the soldering step is reduced while conducting the wave soldering at a lower cost.

SUMMARY OF THE INVENTION

The present invention is generally directed to a wave soldering method and apparatus in which improvements in the efficiency and safety of the fluxing step and/or the reduction of inert gas in the soldering step are obtained. In particular, the present invention is directed to a wave soldering method comprising fluxing a substrate, such as a printed circuit board, in a low oxygen containing atmosphere and preheating the fluxed substrate at least partially in a non-low oxygen containing atmosphere, such as air. Thereafter, the preheated substrate is contacted with the solder wave in a low oxygen containing atmosphere and the soldered substrate is detached from the solder wave.

The fluxing step is conducted in a low oxygen containing atmosphere by any of several methods including foam fluxing, wave fluxing or spray fluxing and the like. The fluxing of the substrate in a low oxygen containing atmosphere substantially eliminates the possibility of flux ignition.

The preheating step is conducted at least partially in a non-low oxygen containing atmosphere, preferably in a two stage process. The first stage of preheating is preferably conducted in air while the second stage of preheating is preferably carried out in a low oxygen containing atmosphere.

In conducting the two stage preheating step, it is desirable to form the low oxygen containing atmosphere in an enclosure which extends outwardly from the solder hood a sufficient distance to cover the latter portion of the preheating section. In the operation of this embodiment of the process, the amount of inert gas necessary to conduct the soldering step is reduced significantly over processes which enclose only the solder pot.

In another embodiment of the invention, the inert gas is provided to the latter portion of the preheating section by direct injection of the gas into the enclosure. The gas may be preheated before entering the extension. In this embodiment, the circuit board is heated by convective heat transfer rather than radiant heat transfer as is typical in wave soldering operations.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to a wave soldering method and apparatus in which the fluxing step is carried out in a low oxygen containing atmosphere and the preheating step is conducted at least partially in a low oxygen containing atmosphere. As used herein, the term low oxygen containing atmosphere is one which contains no more than about 5% oxygen, preferably no more than about 10,000 ppm, most preferably less than about 100 ppm. The remaining portion of the preheating step is conducted in a non-low oxygen containing atmosphere, containing greater than about 5% oxygen, such as air. Non-oxidizing gases (such as nitrogen, carbon dioxide, argon, water vapor, hydrogen and the like) may be used to form the low oxygen containing atmosphere. Nitrogen is the preferred gas.

Figure 1:
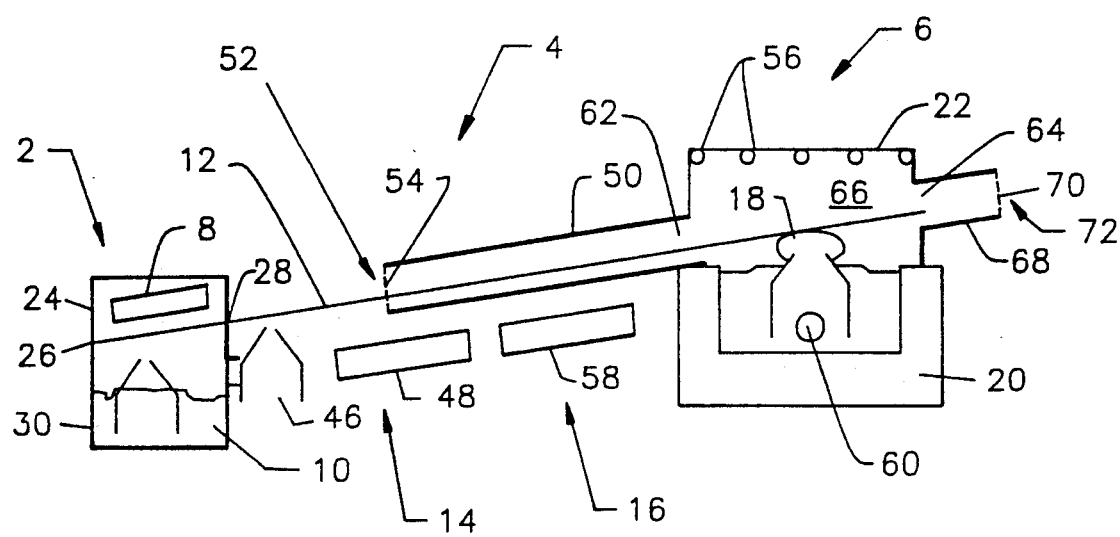
FIG. 1 is a schematic view of one embodiment of the invention in which a low oxygen containing atmosphere is provided for the fluxing step and the preheating step is conducted partly in air and partly in a low oxygen containing atmosphere.

Referring to FIG. 1, there is shown a first embodiment of the invention in which the fluxing step of a wave soldering process is conducted in a low oxygen containing atmosphere and the preheating step is conducted partially in a low oxygen containing atmosphere and partially in a non-low oxygen containing atmosphere such as air.

The wave soldering system includes a fluxing stage 2, a preheating stage 4 and a soldering stage 6. A substrate 8, such as a printed circuit board, is introduced into the fluxing stage 2 where a flux 10 is applied to the underside of the circuit board 8 to improve wetability and solderability of the circuit board 8. Fluxing may be carried out in a known manner such as by spraying or by foaming. A no-clean flux, such as one containing a mixture of rosin (abietic acid), dimethylamine hydrochloride and an alcohol, may be used.

Spray fluxing typically involves a drum rotating in a liquid flux. Air is blown into the drum to generate a spray of flux in the direction of the circuit board. Foam fluxing is conducted by forcing low-pressure air through the pores of an aerator immersed in the flux. The resulting fine bubbles are passed to the surface of the boards by a nozzle. A more detailed explanation of these and other types of fluxing is disclosed in R. J. Klein Wassink "Soldering in Electronics", 2nd Edition, Chapter 9.2, pp. 483–489 (1989), incorporated herein by reference.

The fluxed board is then transferred along a conveyor belt 12 to the preheating stage 4 having a first section 14 for initiating preheating in a non-low oxygen containing atmosphere and a second section 16 for completing preheating in a low oxygen containing atmosphere. The preheated circuit boards 8 are then passed along the same conveyor belt 12 to the soldering stage 6. The circuit board 8 contacts at least one solder wave 18 formed within a solder pot 20 which is enclosed by a hood 22. After soldering, the circuit boards are detached from the solder wave 18 and removed from the wave soldering operation.

The fluxing stage 2 is conducted in a low oxygen containing atmosphere which may be provided, as shown in FIG. 1, in an enclosed environment such as within a hood 24. The hood 24 includes an entrance 26 and an exit 28 for transporting the circuit board 8 into and out of contact with the flux 10. In one embodiment of the invention as shown specifically in FIG. 2, the flux 10 is applied from a flux pot 30 to the underside of the circuit board 8 by mixing the flux 10 with an inert gas to form a foam 32. The inert gas is provided to the flux 10 through at least one injector 34 which may be in the form of a porous stainless steel tube from a source (not shown). Bubbles 36 of the inert gas generate the foam 32 which is lifted into contact with the underside of the circuit board 8.

Figure 2:
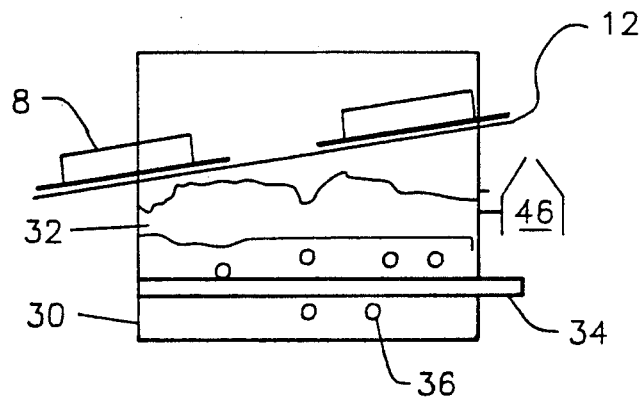
FIG. 2 is a schematic view of one embodiment of the invention where a flux is applied as a foam in a low oxygen containing atmosphere.
Figure 3:
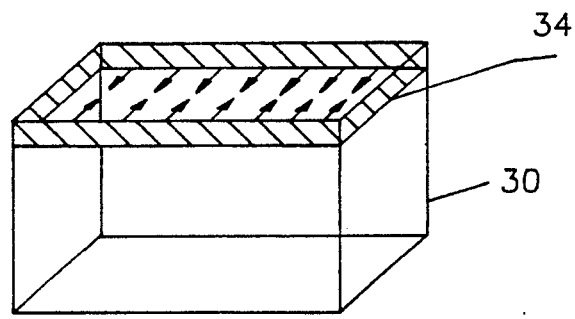
FIG. 3 is a schematic view of another embodiment of the invention where a low oxygen containing atmosphere is provided for the fluxing step.

In another embodiment of the invention, as shown in FIG. 3, fluxing is carried out in a low oxygen containing atmosphere by injecting a laminar flow (shown by the arrows) of an inert gas across the surface of the flux thereby creating a localized low oxygen containing atmosphere, which substantially prevents air from contacting the flux. The inert gas is provided by a standard injector 34 positioned above the flux 10 from at least one, and preferably from opposed ends of the flux pot 30, most preferably from all four ends of the flux pot. Other variations of the position of one or more injectors 34 are possible and within the scope of the invention. The position of the injectors 34 and the volume and velocity of the inert gas obtained therefrom should be sufficient to provide a blanket of inert gas on the surface of the flux 10 to create a localized low oxygen containing atmosphere. In a preferred operation of the fluxing stage 2, it is not necessary to have a hood 24 over the flux pot 30 as shown in the embodiment of FIGS. 1 and 2.

Figure 4:
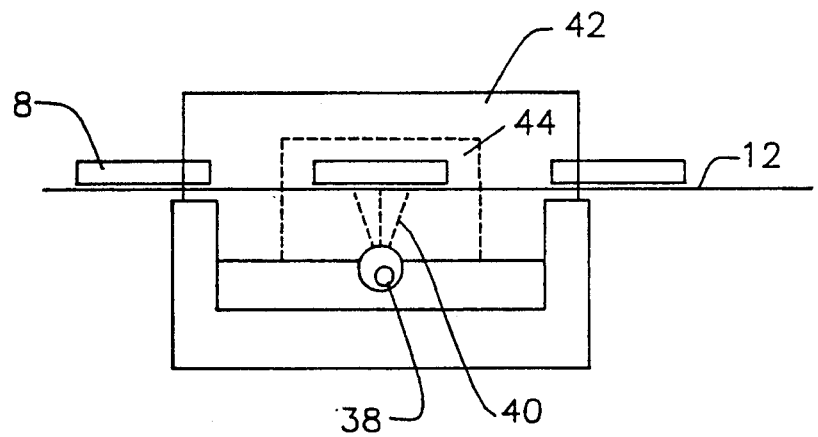
FIG. 4 is a schematic view of another embodiment of the invention in which a low oxygen containing atmosphere is provided for the fluxing step.

In another embodiment of the invention, a spray of the flux and an inert gas is directed to the underside of the circuit board 8. Referring to FIG. 4, a nozzle 38 is provided at or below the surface of the flux 10. A continuous mist of an inert gas is directed upwardly toward the circuit board 8 thereby creating a mist composed of atomized droplets 40 of the flux 10. The conveyor belt 12 which transports the circuit boards 8 through the fluxing stage 2 is preferably in a horizontal position as shown in FIG. 4. This allows the most efficient coverage of the underside of the circuit board with the flux.

The embodiment of FIG. 4 is conducted in at least a partially enclosed space 42 which is formed by the flux hood 24 and the solder pot 30. As shown specifically in FIG. 4, the hood 24 completely encloses the fluxing stage 2. It should be understood, however, that only the area 44 in which the circuit board 8 contacts the spray of the flux 10 need be enclosed as outline by the dotted lines in FIG. 4.

Once the flux 10 has been applied to the circuit board 8, excess flux is then removed. This may be accomplished in a number of ways, typically by use of a customary air-knife 46 as shown in FIG. 1. The fluxed circuit board 8 is then sent to the preheating stage 4.

In accordance with the present invention, preheating is conducted in two sections, a first section 14 where preheating is initiated in a non-low oxygen containing atmosphere (e.g. air), and a second section 16 which is provided with a low oxygen containing atmosphere.

Referring to FIG. 1, the preheating stage 4 is provided with a first heater 48 in the first preheating section 14. The first preheater 48 emits heat in the range of about 460° to about 485° C. The heat is directly absorbed by the circuit board (i.e. radiant heating) until the circuit board reaches a temperature of from about 65° C. to about 125° C. Heating of the circuit board 8 may be conducted in the first preheating section 14 entirely in air, or as shown in FIG. 4, partially in air and partially in a low oxygen containing atmosphere.

This atmosphere is present within an extension 50 of the solder hood 22. The extension 50 is provided with a sufficient amount of a non-oxygen containing gas (e.g. nitrogen gas) so that the environment within the extension 50 is a low oxygen containing atmosphere having an entrance 52 shielded by a curtain 54. The curtain provides a partial physical barrier to the flow of air into the second preheating section 16 of the preheating stage 4. The curtain 54 may be in the form of strips of cloth, rubber, or suitable plastic such as polyethylene.

As shown in FIG. 1, at least one (five are shown) gas injectors 56 are positioned within the solder hood 22. An inert gas (i.e. nitrogen gas) is delivered from the injectors 56 in an amount sufficient to fill the solder hood 22 and diffuse into the extension 50.

The initially preheated circuit board 8 then passes into the second preheating section 16 of the preheating stage 4. Preheating is accomplished in this section by a second preheater 58 which operates at the same temperature (460°–485° C.) as the first preheater 48 and raises the temperature of the circuit boards 8 to about 200° C. The second preheating section 16 operates entirely in a low oxygen containing atmosphere within the extension 50 of the solder hood 22. The preheating of the circuit board 8 is therefore provided under conditions which minimize the cost of the preheating operation while substantially eliminating the problems associated with preheating entirely in a non-low oxygen containing atmosphere such as air.

The preheated circuit board 8 then enters the soldering stage 6 which is comprised of a solder pot 20 containing solder, a device such as an impeller 60 for generating at least one solder wave 18, an entrance 62 for receiving the circuit boards 8 from the preheating stage 4 and an exit 64 for discharging the soldered boards from the wave soldering operation. The soldering stage 6 is conducted within the solder hood 22 which defines an enclosed space 66 above the solder wave 18 for providing and maintaining a low oxygen containing atmosphere.

The circuit board 8 is brought within the space 66 and contacts the solder wave 18 in a low oxygen containing atmosphere. The low oxygen containing atmosphere is provided, as previously indicated, by at least one injector 56. The injectors 56 may be regulated in a customary manner to provide sufficient inert gas (e.g. nitrogen gas) to produce and maintain a low oxygen containing atmosphere within the enclosed space 66.

After the circuit boards 8 pass the solder wave 18, they leave the solder hood proper and pass through the exit 64. At this stage of the wave soldering operation, the circuit boards 8 begin to cool within a second extension 68 of the solder hood. A curtain 70, similar to the curtain 54, is provided at the exit 72 of the second extension 68. The second extension 68, therefore, provides a low oxygen containing atmosphere by the inert gas injected into the enclosed space 66.

In another embodiment of the invention, the second preheating section is provided with at least one injector for providing a low oxygen containing atmosphere in the preheating section.

Figure 5:
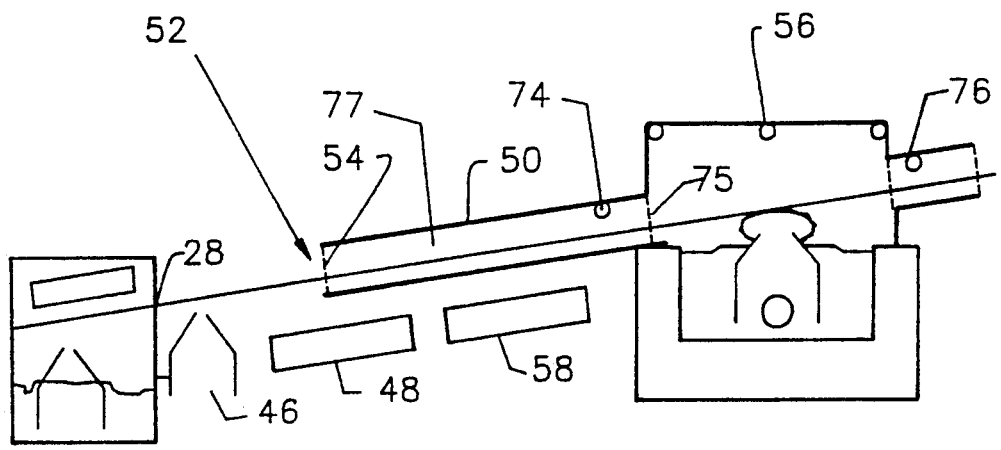
FIG. 5 is a schematic view of still another embodiment of the invention in which a low oxygen containing atmosphere is directly provided in a portion of the preheating section by an injector within an extension of the enclosure covering the solder pot; and·

Referring to FIG. 5, at least one injector 74 (only one is shown in FIG. 5) is positioned with the extension 50. Air is prevented from entering the extension 50 by the curtain 54 positioned at the entrance 52 of the extension 50. The entrance 62 of the solder hood 22 is also provided with a curtain 75 so that the enclosed space 77 within the extension 50 is substantially isolated from the atmosphere and from the enclosed space 66 within the solder hood 22. This embodiment of the invention minimizes the amount of inert gas needed to provide a low oxygen containing atmosphere within the extension 50. In addition, an optional injector 76 may be provided in the second extension 68 of the solder hood 22 to insure a low oxygen containing atmosphere when the circuit boards detach from the solder wave 18 and begin to cool.

In the embodiments described in connection with FIGS. 1-5, preheating of the circuit boards is provided by direct radiation heating through the preheaters 48 and 58, respectively. Preheating of the circuit boards in this manner, while adequate to properly heat circuit boards prior to soldering and at lower costs than typical prior art processes, is often non-uniform due to the uneven distribution of the metal components of the circuit boards. A more uniform method of preheating can be provided by preheating the inert gas prior to forwarding the inert gas to the injector 74. In this embodiment of the invention the preheated gas serves as the heating medium and thereby convectively heats the circuit board 8.

Figure 6:
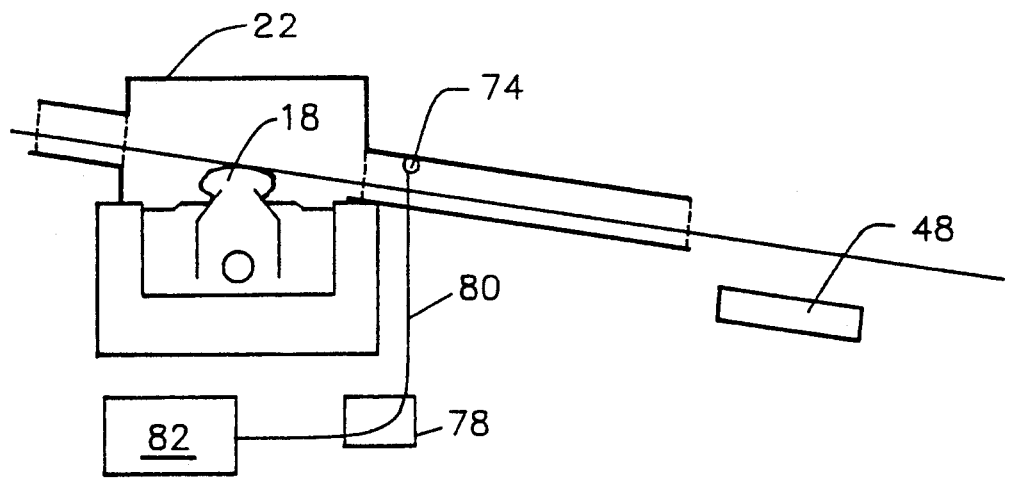
FIG. 6 is a schematic view of a portion of the embodiment shown in FIG. 5 showing preheating of the gas prior to injection into a portion of the preheating section.

Referring to FIG. 6, the injector 74, preferably spanning the width of the extension 50, is connected to a heater 78, preferably an electric heater, via a conduit 80 which receives metered amounts of gas from a flow controller 82. A gas (e.g. an inert gas such as nitrogen) is sent from a source (not shown) to the flow controller 82 which discharges controlled amounts of the gas to the heater 78. The heater 78 raises the temperature of the gas to the preheating operation temperature of about 315° C. The heated gas then flows via the conduit 80 to the injector 74 which distributes the preheated gas uniformly throughout the extension 50, as shown in FIG. 5 and to raise the temperature of the circuit board 8 to an operation temperature of about 200° C.

The use of a heater 78 to preheat the gas eliminates the need to have a second radiant heater 58 as shown in FIGS. 1 and 5. Instead, the heated gas exiting the injector 74 provides sufficient thermal energy to the circuit boards to raise their temperature to about 200° C.

EXAMPLE 1

The process of the present invention is conducted using the wave soldering operation shown in FIG. 1. A substrate in the form of a circuit board 8 travels along the conveyor belt 12 and is fluxed with a foam fluxing device as shown in FIG. 2. The flux is mixed with an inert gas (e.g. nitrogen gas) to form the foam. The inert gas is provided at the rate of 100 standard cubic feet per hour (scfh) to produce a low oxygen containing atmosphere within the flux hood 24 containing about 500 ppm of oxygen. The excess flux is removed by the air knife 46 and the fluxed circuit board 8 proceeds via the conveyor belt 12 to the preheating section 4 including the first and second preheaters 48 and 58.

The initial preheating is accomplished induced by the first preheater 48 to a temperature of from 460° to 485° C. in a non-low oxygen containing atmosphere, such as air. The initial preheating is conducted outside of the extension 50. As the circuit board 8 moves toward the region of the second preheater 58, operating at a temperature of 460° to 485° C., it enters the extension 50 which contains a low oxygen containing atmosphere. The atmosphere is provided by injecting nitrogen gas through the injectors 56 contained within the solder hood 22. In this example, the injectors 56 provide 1,600 scfh of nitrogen gas within the solder pot 20 to attain a low oxygen containing atmosphere having an oxygen level of about 7 ppm.

As previously explained, the nitrogen from the injectors 74 will diffuse into the extension 50 to provide a low oxygen containing atmosphere extending to the second preheating section 16. The oxygen level within the second preheating section 16 is about 140 ppm in accordance with this example.

EXAMPLE 2

The process of the present invention is conducted using the wave soldering operation shown in FIG. 5. Additional injectors 74 and 76 are placed in the extension 50 and the extension 68, respectively. The flow rate of gas required in this construction is about 1,200 scfh and 100 scfh within the flux region. The corresponding oxygen levels within the soldering stage are about 6 ppm and about 30 ppm in the extensions 50 and 68. The atmosphere within the fluxing hood 24 is about 500 ppm.

EXAMPLE 3

The process of the present invention is conducted in accordance with the wave soldering operation modified to preheat the inert gas as shown in FIG. 6.

Nitrogen gas is injected into the heater 78 by means of a flow controller 82. The conduit 80 is preferably made of stainless steel with Teflon lining. The exiting gas from the heater 78 has a temperature of about 315° C. The injector 74 is a tube stretching across the width of the extension 50. This injector can be directional or made of porous stainless steel to obtain diffusory flow. The gas enters the extension 50 thereby heating the circuit board 8 prior to contact with the solder wave 18 and thus preventing thermal shock.

COMPARATIVE EXAMPLE

A process described in U.S. Pat. No. 5,176,307 where fluxing and preheating are conducted in air was performed in accordance with Example 1. The flow rate required to carry out the method was in the range of from 1,800 to 2,000 scfh as compared with 1,200 to 1,600 scfh conducted in accordance with Examples 1 and 2 of the present application.

What is claimed:
1. A wave soldering method comprising:
   (a) fluxing a substrate in a low oxygen containing atmosphere;
   (b) preheating the fluxed substrate at least partially in a non-low oxygen containing atmosphere;
   (c) contacting the preheated substrate with a solder wave in a low oxygen containing atmosphere; and
   (d) detaching the soldered substrate from the solder wave.
2. The wave soldering method of claim 1 wherein the low oxygen containing atmosphere has less than 5% oxygen.
3. The wave soldering method of claim 1 wherein the low oxygen containing atmosphere has less than 10,000 ppm of oxygen.
4. The wave soldering method of claim 1 wherein the low oxygen containing atmosphere has less than 100 ppm of oxygen.
5. The wave soldering method of claim comprising preheating the fluxed substrate in a non-low oxygen containing atmosphere.
6. The wave soldering method of claim comprising preheating the fluxed substrate in two stages, a first stage in which the fluxed substrate is preheated in a non-low oxygen containing atmosphere, and a second stage immediately following the first stage in which the fluxed substrate is preheated in a low oxygen containing atmosphere.
7. The method of claim 6 wherein the first stage of the preheating step is carried out in air.
8. The wave soldering method of claim 1 wherein the step of preheating the fluxed substrate is conducted partially in a low oxygen containing atmosphere, said method comprising injecting a non-oxidizing gas into the soldering stage define in step (c) and allowing said non-oxidizing gas to diffuse into a preheating stage defined in step (b).
9. The method of claim 1 wherein the step of preheating the fluxed substrate is conducted partially in a low oxygen containing atmosphere, said method comprising injecting a non-oxidizing gas directly into a fluxing stage defined in step (a).
10. The wave soldering method of claim 9 further comprising preheating the non-oxidizing gas prior to injecting into the preheating step.
11. The wave soldering method of claim 9 wherein the non-oxidizing gas is nitrogen gas.
12. The wave soldering method of claim comprising detaching the soldered substrate from the solder wave in a low oxygen containing atmosphere.
13. The wave soldering method of claim 12 comprising injecting a non-oxidizing gas as the soldered substrate detaches from the solder wave defined in step (d).
14. The wave soldering method of claim 13 wherein the non-oxidizing gas is nitrogen gas.
15. A wave soldering method comprising:
   (a) fluxing a substrate in a low oxygen containing atmosphere;
   (b) preheating the fluxed substrate in two stages, a first stage in which the fluxed substrate is heated in air and a second stage in which the fluxed substrate is heated in a low oxygen containing atmosphere;
   (c) contacting the preheated substrate with a solder wave in a low oxygen containing atmosphere; and
   (d) detaching the soldered substrate from the solder wave in a low oxygen containing atmosphere.
16. A wave soldering apparatus comprising:
   (a) means for fluxing a substrate in a low oxygen containing atmosphere;
   (b) means for preheating the fluxed substrate at least partially in a low oxygen containing atmosphere;

(c) means for contacting the preheated substrate with a solder wave in a low oxygen containing atmosphere; and (d) means for detaching the soldered substrate from the solder wave.

17. The wave soldering apparatus of claim 16 comprising a hood covering a soldering pot, means associated with the solder pot to generate said solder wave, an extension of the solder hood extending from the hood to the preheating means and means within the solder hood for generating a low oxygen containing atmosphere in the solder hood and the extension of the hood.

18. The wave soldering apparatus of claim 17 further comprising means within the extension for generating a low oxygen containing atmosphere within the extension.

19. The wave soldering apparatus of claim 18 wherein the means for generating a low oxygen containing atmosphere within the extension of the hood comprises at least one injector within the extension for injecting a non-oxidizing gas into the extension.

* * * * *